United States Patent [19]

Kahn

[11] Patent Number: 5,102,150
[45] Date of Patent: Apr. 7, 1992

[54] PRESSURE VESSEL FLEX JOINT

[75] Inventor: Jon B. Kahn, League City, Tex.

[73] Assignee: The United States of America as represented by the Administrator of the National Aeronautics and Space Administration, Washington, D.C.

[21] Appl. No.: 657,598

[22] Filed: Feb. 19, 1991

[51] Int. Cl.$^5$ .................... F16J 15/46; F16L 27/10
[52] U.S. Cl. ............................ 277/3; 277/34; 277/34.3; 285/97; 285/223; 285/346; 285/910
[58] Field of Search ...................... 277/3, 34, 34.3; 285/223, 97, 336, 910, 231, 224, 346; 220/435, 436

[56] References Cited

U.S. PATENT DOCUMENTS

| | | |
|---|---|---|
| 1,859,065 | 5/1932 | Anderson . |
| 2,306,990 | 12/1942 | Essl .................................. 277/34 |
| 2,369,823 | 2/1945 | Freed ............................... 277/34.3 |
| 3,591,963 | 7/1971 | Kopp ........................... 277/34.3 X |
| 3,773,338 | 11/1973 | Fidler et al. ....................... 277/95 |
| 3,897,088 | 7/1975 | Beinhaur ..................... 277/34.3 X |
| 4,401,306 | 8/1983 | Arnold ............................ 277/34.3 |
| 4,480,859 | 11/1984 | Rueckl et al. ................ 285/223 X |
| 4,614,206 | 9/1986 | Mathison et al. ............. 285/259 X |
| 4,624,465 | 11/1986 | Rogemont ........................ 277/34 |
| 4,819,565 | 4/1989 | Bechu ............................... 105/11 |

FOREIGN PATENT DOCUMENTS

| | | |
|---|---|---|
| 1229350 | 11/1966 | Fed. Rep. of Germany ...... 285/224 |
| 2010538 | 9/1971 | Fed. Rep. of Germany ..... 277/34.3 |
| 2135514 | 1/1973 | Fed. Rep. of Germany ...... 285/231 |
| 0385111 | 5/1973 | U.S.S.R. .......................... 277/34.3 |
| 1065922 | 4/1967 | United Kingdom ............... 277/34.3 |

Primary Examiner—William A. Cuchlinski, Jr.
Assistant Examiner—James K. Folker
Attorney, Agent, or Firm—Russell E. Schlorff; John R. Manning; Edward K. Fein

[57] ABSTRACT

An airtight, flexible joint is disclosed for the interfacing of two pressure vessels such as between the Space Station docking tunnel and the Space Shuttle Orbiter's bulkhead adapter. The joint provides for flexibility while still retaining a structural link between the two vessels required due to the loading created by the internal/external pressure differential. The joint design provides for limiting the axial load carried across the joint to a specific value, a function required in the Orbiter/Station tunnel interface. The flex joint comprises a floating structural segment which is permanently attached to one of the pressure vessels through the use of an inflatable seal. The geometric configuration of the joint causes the tension between the vessels created by the internal gas pressure to compress the inflatable seal. The inflation pressure of the seal is kept at a value above the internal/external pressure differential of the vessels in order to maintain a controlled distance between the floating segment and pressure vessel. The inflatable seal consists of either a hollow torus-shaped flexible bladder or two rolling convoluted diaphragm seals which may be reinforced by a system of straps or fabric anchored to the hard structures. The joint acts as a flexible link to allow both angular motion and lateral displacement while it still contains the internal pressure and the holds the axial tension between the vessels.

19 Claims, 7 Drawing Sheets

PRESSURE VESSEL FLEX JOINT

ORIGIN OF THE INVENTION

The invention described herein was made by employee(s) of the United States Government and may be manufactured and used by or for the Government of the United States for governmental purposes without the payment of royalties thereon or therefor.

BACKGROUND OF THE INVENTION

1. Field of the Invention

This invention relates generally to flex joints for pressure vessels and more particularly to an airtight, flexible joint for the interfacing of two pressure vessels such as between the Space Station docking tunnel and the Space Shuttle Orbiter's bulkhead adapter.

2. Brief Description of the Prior Art

Prior methods of providing a load-carrying flex joint between pressure vessels include using a flexible bellows along with a separate, adjustable structural linkage system, or a spherical ball-joint type interface with dynamic seals.

The disadvantages of using a bellows or other type of flexible material section is that the parallel structural link must not only hold the loading created by the pressure differential, but it must be designed to adjust for position/angle misalignment, possible even dynamic motion. This requires a system that is most likely very mechanically complex, especially if it is to be unbiased in its orientation, or if it is to also act as a load-limiter. A spherical ball-joint requires a dynamic seal, and it does not allow for any misalignment or adjustments other than angular. To adjust laterally, two ball-joints and a telescoping segment must be used in series, a configuration which requires extra space due to its length.

Rogemont U.S. Pat. No. 4,624,465 discloses a seal joint designed to be used in a slot or groove. The joint has an inflatable internal volume of pressurized fluid and an external seal surface. The joint is made to withstand pressure, deformation, and extension. The joint may be used for nuclear, aerospace, electronic, and medical areas.

Anderson U.S. Pat. No. 1,859,065 discloses a joint for pipes or vessels which contain pressurized fluid comprising a liquid or a gas. The joint is used to connect one of the members to an opposite member, wherein one of the members which is slightly flexible at its end is acted upon by an internal pressure in such a way as to have a fluid-tight contact with the opposite member. See col. 1, lines 12-29.

Bechu U.S. Pat. No. 4,819,565 discloses a tubular joint or a sealing joint for connecting two successive members. The joint is a U-shaped membrane filled with pressurized fluid. The joint can withstand all mechanical pulls exerted upon it and has a very high durability.

Fidler et al. U.S. Pat. No. 3,773,338 discloses a flexible seal which connects two members together. The flexible seal has a predetermined range of multi-directional fluctuations while maintaining sealing contact with two members.

The present invention is distinguished over the prior art in general, and these patents in particular by an airtight, flexible joint designed for the interfacing of two pressure vessels such as between the Space Station docking tunnel and the Space Shuttle Orbiter's bulkhead adapter. The joint provides for flexibility while still retaining a structural link between the two vessels required due to the loading created by the internal/external pressure differential. The joint design provides for limiting the axial load carried across the joint to a specific value, a function required in the Orbiter/Station tunnel interface. The flex joint comprises a floating structural segment which is permanently attached to one of the pressure vessels through the use of an inflatable seal. The geometric configuration of the joint causes the tension between the vessels created by the internal gas pressure to compress the inflatable seal. The inflation pressure of the seal is kept at a value above the internal/external pressure differential of the vessels in order to maintain a controlled distance between the floating segment and pressure vessel. The inflatable seal consists of either a hollow torus-shaped flexible bladder or two rolling convoluted diaphragm seals which may be reinforced by a system of straps or fabric anchored to the hard structures. The joint acts as a flexible link to allow both angular motion and lateral displacement while it still contains the internal pressure and the holds the axial tension between the vessels.

SUMMARY OF THE INVENTION

It is therefore an object of the present invention to provide a new and improved airtight, flexible joint for the interfacing of two pressure vessels.

It is another object of this invention is to provide a new and improved airtight, flexible joint for the interfacing of two pressure vessels such as between the Space Station docking tunnel and the Space Shuttle Orbiter's bulkhead adapter.

It is another object of this invention is to provide a new and improved airtight, flexible joint for the interfacing of two pressure vessels such as between the Space Station docking tunnel and the Space Shuttle Orbiter's bulkhead adapter, in which the joint acts as a flexible link to allow both angular motion and lateral displacement while it still contains the internal pressure and the holds the axial tension between the vessels.

Another object of this invention is to provide a new and improved airtight, flexible joint for the interfacing of two pressure vessels such as between the Space Station docking tunnel and the Space Shuttle Orbiter's bulkhead adapter which provides for flexibility while still retaining a structural link between the two vessels required due to the loading created by the internal/external pressure differential.

Another object of this invention is to provide a new and improved airtight, flexible joint for the interfacing of two pressure vessels such as between the Space Station docking tunnel and the Space Shuttle Orbiter's bulkhead adapter which provides for limiting the axial load carried across the joint to a specific value, a function required in the Orbiter/Station tunnel interface.

Another object of this invention is to provide a new and improved airtight, flexible joint for the interfacing of two pressure vessels such as between the Space Station docking tunnel and the Space Shuttle Orbiter's bulkhead adapter which has an inflatable seal arranged in a configuration which enables it to allow for both angular and lateral flexibility under pressure while still retaining an axial structural link across the joint.

Another object of this invention is to provide a new and improved airtight, flexible joint for the interfacing of two pressure vessels such as between the Space Station docking tunnel and the Space Shuttle Orbiter's bulkhead adapter which has an inflatable seal arranged in a configuration which enables it to allow for both angular and lateral flexibility under pressure while still retaining an axial structural link across the joint and which has a gas pressure control system to allow the joint to be compressed or elongated without changing the axial load carried across it, and to actively control this distance for positioning purposes.

Still another object of this invention is to provide a new and improved airtight, flexible joint for the interfacing of two pressure vessels such as between the Space Station docking tunnel and the Space Shuttle Orbiter's bulkhead adapter which comprises a floating structural segment which is permanently attached to pressure vessel through the use of an inflatable seal.

Still another object of this invention is to provide a new and improved airtight, flexible joint for the interfacing of two pressure vessels such as between the Space Station docking tunnel and the Space Shuttle Orbiter's bulkhead adapter which comprises a floating structural segment which is permanently attached to pressure vessel through the use of an inflatable seal in which the geometric configuration of the joint causes the tension between the vessels created by the internal gas pressure to compress the inflatable seal.

A further object of this invention is to provide an improved airtight, flexible joint for the interfacing of two pressure vessels such as between the Space Station docking tunnel and the Space Shuttle Orbiter's bulkhead adapter which comprises a floating structural segment which is permanently attached to pressure vessel through the use of an inflatable seal in which the geometric configuration of the joint causes the tension between the vessels created by the internal gas pressure to compress the inflatable seal and the inflation pressure of the seal is kept at a value above the internal/external pressure differential of the vessels in order to maintain a controlled distance between the floating segment and pressure vessel.

A further object of this invention is to provide an improved airtight, flexible joint for the interfacing of two pressure vessels such as between the Space Station docking tunnel and the Space Shuttle Orbiter's bulkhead adapter which comprises a floating structural segment which is permanently attached to pressure vessel through the use of an inflatable seal consisting of a hollow torus-shaped flexible bladder which may be reinforced by a system of straps or fabric anchored to the hard structures in which the geometric configuration of the joint causes the tension between the vessels created by the internal gas pressure to compress the inflatable seal and the inflation pressure of the seal is kept at a value above the internal/external pressure differential of the vessels in order to maintain a controlled distance between the floating segment and pressure vessel.

A still further object of this invention is to provide a pressure vessel flex joint which achieves lateral and angular flexibility, axial load-carrying capacity, axial distance control, and axial load limiting, all without the need of dynamic seals, electric motors, or electrical control systems.

A still further object of this invention is to provide a pressure vessel flex joint having inherent simplicity and structural efficiency providing a lighter system than can be achieved through existing design alternatives.

Other objects of the invention will become apparent from time to time throughout the specification and claims as hereinafter related.

DESCRIPTION OF THE PREFERRED EMBODIMENTS

Figure 1:
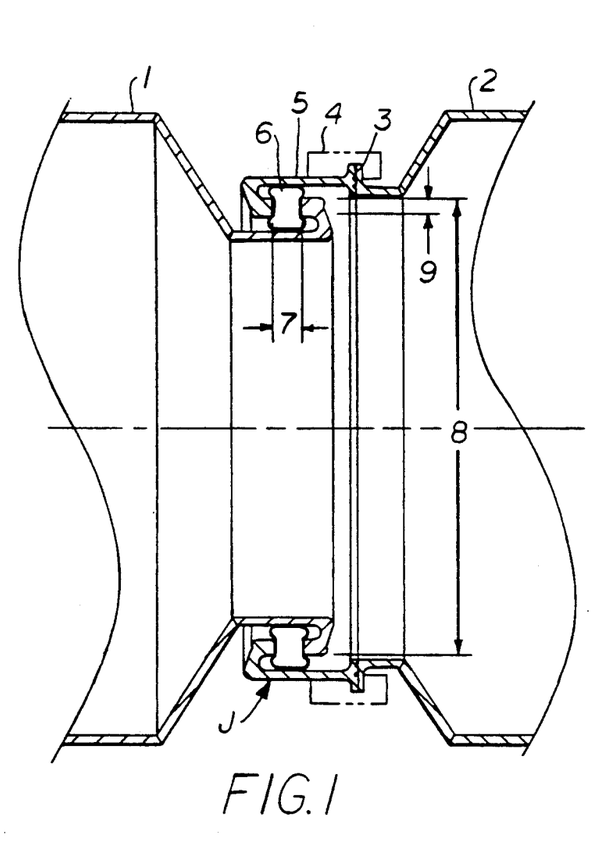
FIG. 1 is a cross section of a flexible pressure vessel joint illustrating a preferred embodiment of the invention to assist in the interfacing of two pressure vessels by compensating for lateral or angular misalignment.
Figure 2:
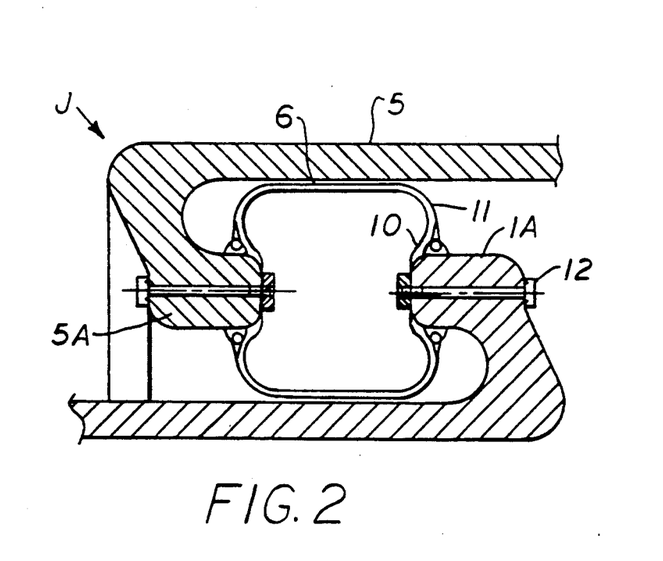
FIG. 2 is a detail cross section of the inflatable seal of FIG. I which consists of a hollow torus-shaped flexible bladder reinforced by a system of straps or fabric anchored to the hard structures.

Referring to the drawings by numerals of reference, and more particularly to FIGS. 1-2, there is shown an airtight, flexible joint required in the interfacing of two pressure vessels such as between the Space Station docking tunnel and the Space Shuttle Orbiter's bulkhead adapter.

In FIG. 1, there are shown pressure vessels 1 and 2 having walls of circular or other suitable cross section interconnected by a novel joint J which compensates for lateral or angular misalignment. An interface seal 3 is attached by a device 4, the details of which are not a part of this invention.

The flex joint J comprises a floating structural segment 5 permanently attached to pressure vessel 1 by an inflatable toroidal seal 6. The geometric configuration of the design (inturned flange 5A on segment 5 and outturned flange 1A on vessel 1) causes the tension between the vessels created by the internal gas pressure (which tends to separate vessels 1 and 2) to compress the inflatable toroidal seal 6.

The inflation pressure of the toroidal seal 6 is maintained above the internal/external pressure differential of the vessels 1 and 2 to maintain a controlled distance 7 between the floating segment 5 and pressure vessel 1. The inflation pressure is equal to the pressure differential multiplied by the ratio of tunnel area 8 to seal interface lip area 9. The inflatable toroidal seal 6 (FIG. 2) comprises a hollow torus-shaped flexible bladder 10 reinforced by straps or fabric 11 anchored to the hard structures (flanges 1A and 5A).

Figure 3:
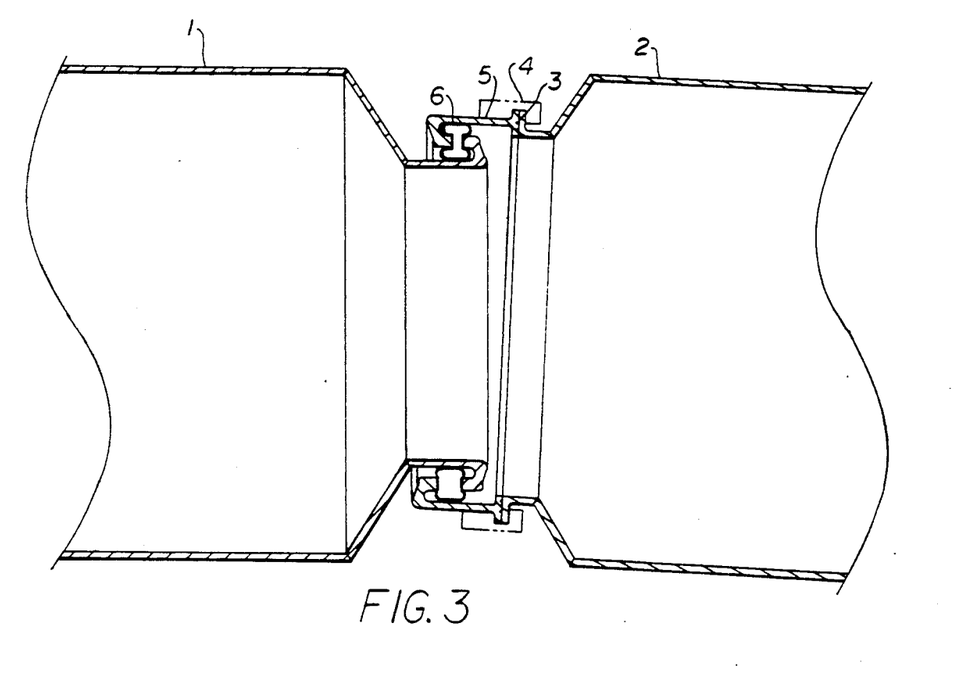
FIG. 3 is a cross section of the joint shown in FIG. 1 illustrating flexible movement of the joint while it still contains the internal pressure and the holds the axial tension between the vessels.

In FIG. 3, the vessels 1 and 2 are displaced angularly (see centerline displacement). The joint J acts as a flexible link to allow such angular motion while it still contains the internal pressure in toroidal bladder 10 and holds the axial tension between the vessels. The joint J allows this to happen (even dynamically) because the gas inside the seal 6 is free to shift internally, allowing the seal 6 to deform without any significant resistance. In this configuration, the overall quantity of gas inside the seal retains constant.

Figure 4:
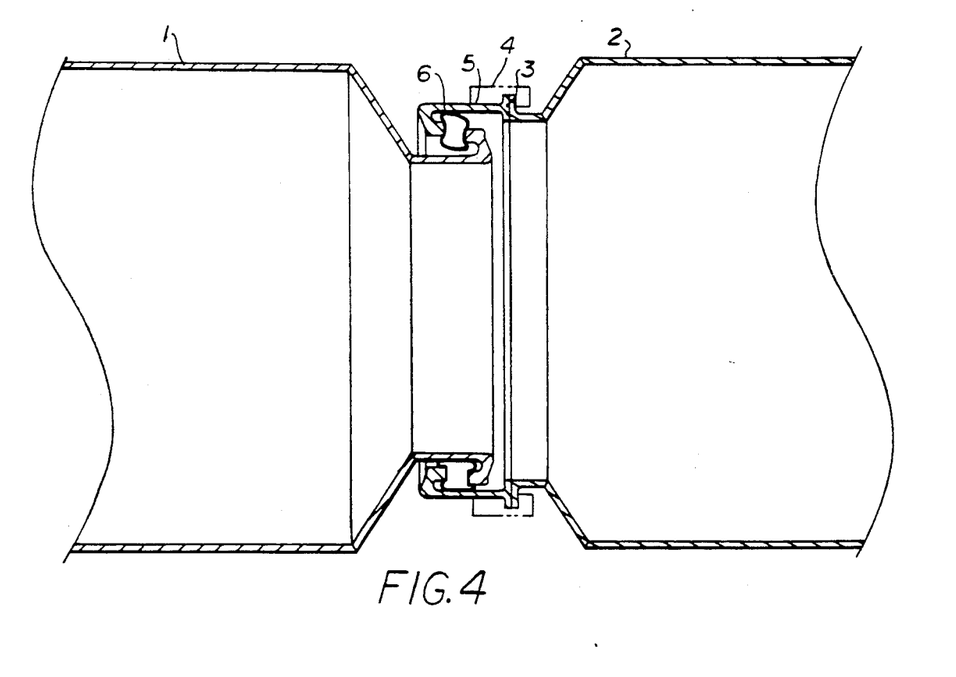
FIG. 4 is a cross section of the joint shown in FIG. 1 illustrating lateral displacement of the joint while it still contains the internal pressure and the holds the axial tension between the vessels.

In FIG. 4, the vessels 1 and 2 are displaced laterally centerline displacement). As in FIG. 3, the joint J acts as a flexible link to allow such lateral displacement while it still contains the internal pressure in toroidal bladder 10 and the holds the axial tension between the vessels. The joint J allows this to happen (even dynamically) because the gas inside the seal 6 is free to shift internally, allowing the seal 6 to deform without any significant resistance. In this configuration, the overall quantity of gas inside the seal remains constant.

Figure 5:
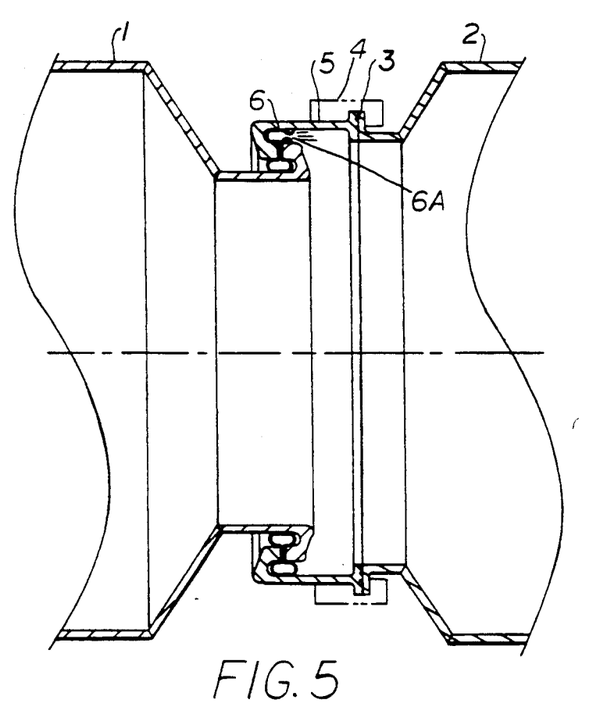
FIG. 5 is a cross section of the joint shown in FIG. 1 illustrating the effect of loss of pressure in the joint which allows the two opposing structures to come together as the seal deflates.

In order to provide redundancy in the joint J, the seal bladder 10 may be attached to the flanges 1A and 5A by a plurality of airtight fastener/brackets 12. These brackets will prevent loss of pressure from the vessels 1 and 2 should the bladder be out on one side (6A in FIG. 5), because the side of the bladder which is intact will contain the internal vessel pressure. Should this happen, the tension in the joint J (no longer retained by the pressure in seal bladder 10) will cause the two opposing flanges 1A and 5A to come together as the seal deflates (FIG. 5). The distance between the vessels will grow by this amount if they are not otherwise restrained. The system at this point would still be an airtight link, but it would lose its capacity to flex freely.

Figure 6:
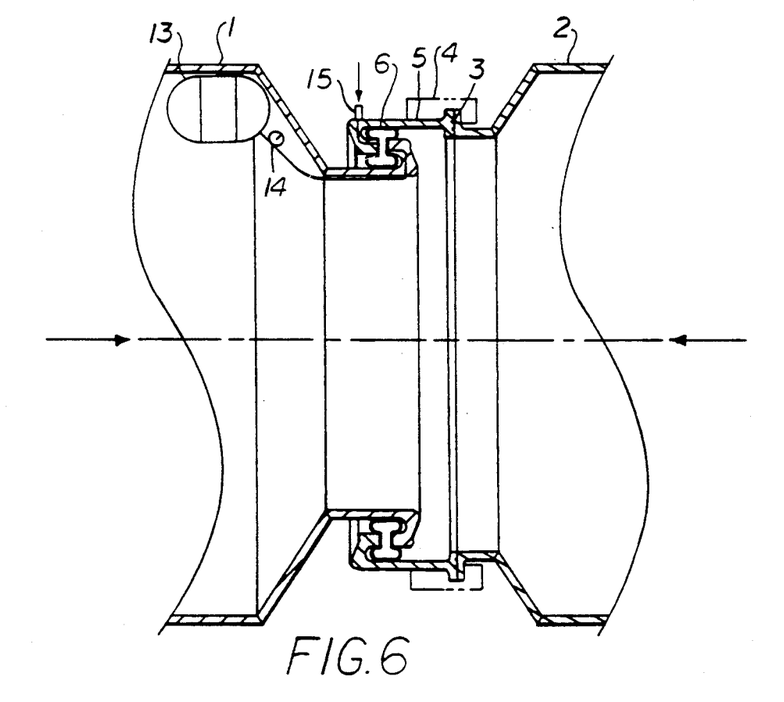
FIG. 6 is a cross section of the joint shown in FIG. 1 modified to allow the axial distance between the vessels to change due to external loads without affecting the loading between the vessels or the flex capacity by including a pressure control system having pressure regulator and pressure-relief.
Figure 7:
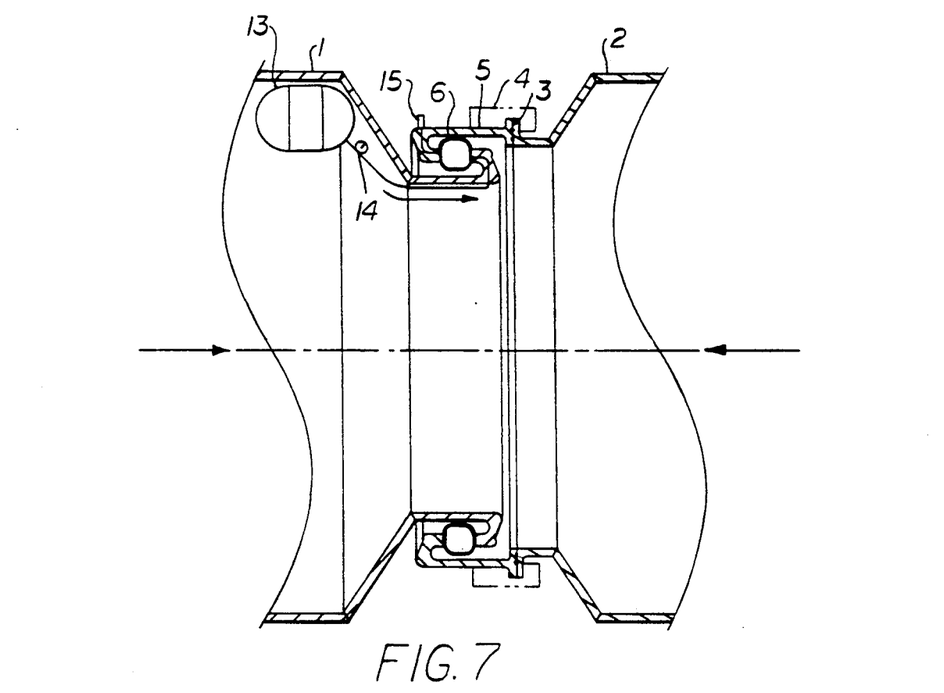
FIG. 7 is a cross section of the joint shown in FIG. 6 illustrating movement of the joint during loads compressing the vessels together where the seal is stretched and pressure decreased enough for the pressure regulator to open and supply more gas to the seal from the reservoir, thus allowing dynamic axial motion between the vessels until the supply of gas in the reservoir is depleted.

In FIGS. 6 and 7, the joint J is modified to allow the axial distance between the vessels to change due to external loads without affecting the loading between the vessels or the flex capacity. The joint J is constructed as in FIGS. 1 and 2, and reference numerals are the same, except for the addition of a pressure control system comprising a high-pressure reservoir 13, connected to the inflatable seal 6 through a pressure regulator 14, along with a pressure-relief valve 15 connected to seal bladder 10 through passages 15 A in flange 1A.

If external loads are trying to increase the distance between the vessels, the seal bladder 10 will be compressed in volume because the seal pressure will increase slightly, enough to bleed gas out through the relief valve 15 (FIG. 6). If the loads are trying to compress the vessels together, the seal bladder 10 will be stretched and the internal pressure will drop slightly, enough so that the pressure regulator 14 will open and supply more gas to the seal from the reservoir 13 (FIG. 7). The regulator 14 and the relief valve 1 are activated automatically due to pressure differentials, and therefore no active electrical control system is required. The joint J will allow dynamic axial motion between the vessels (while keeping the load relatively constant) until the supply of gas in the reservoir 13 is depleted.

Figure 8:
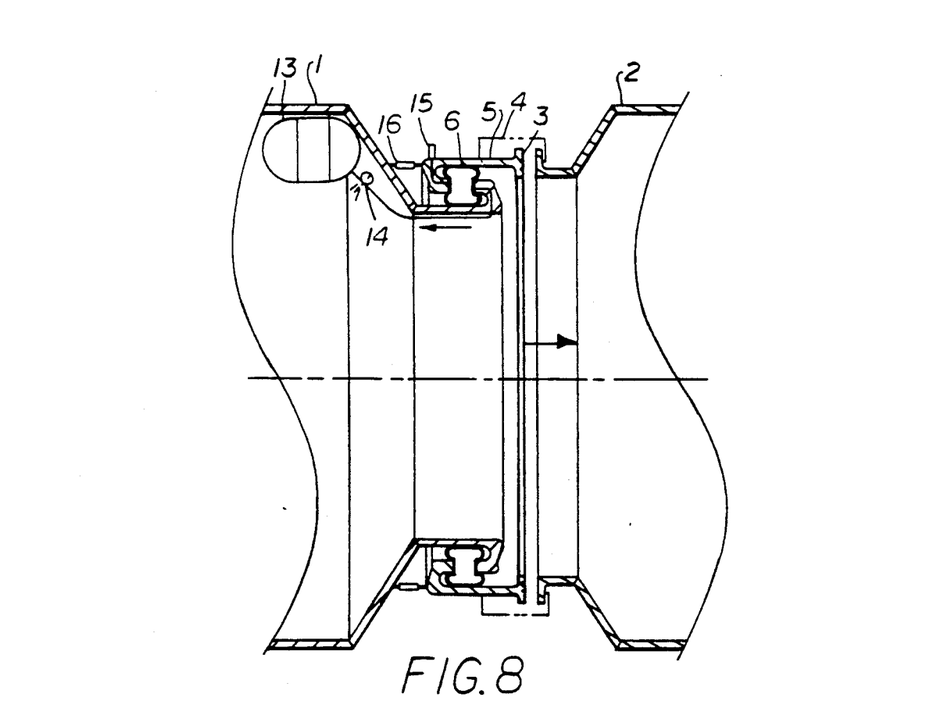
FIG. 8 is a cross section of another embodiment of the joint shown in FIG. 6 which enables the joint to serve as an active aid in connecting the vessels at the interface by addition of a series of compression-springs between the pressure vessels to effect controlled movement by the springs by changing pressure in the seal.

In FIG. 8, there is shown modification of the embodiment of FIGS. 6 and 7 which enables the joint J to serve as an active aid in connecting the vessels 1 and 2 at the interface. A plurality of compression-spring devices 16 are positioned at spaced intervals between pressure vessel 1 and the floating segment S. In this embodiment, the amount of gas that is fed into the inflatable seal bladder 10 will extend or retract the floating segment S relative to vessel 1. If it is desired, for instance, to extend the segment 5 for mating with pressure vessel 2, the initial seal pressure is decreased enough so that the force of the springs 16 pushes the floating segment 5 out until contact is made at the interfacing seal 3 (FIG. 8). This embodiment allows for a simplification in the design of the attachment device 4, because it removes the requirement for a 'reach-out' capability during vessel mating.

Figure 9:
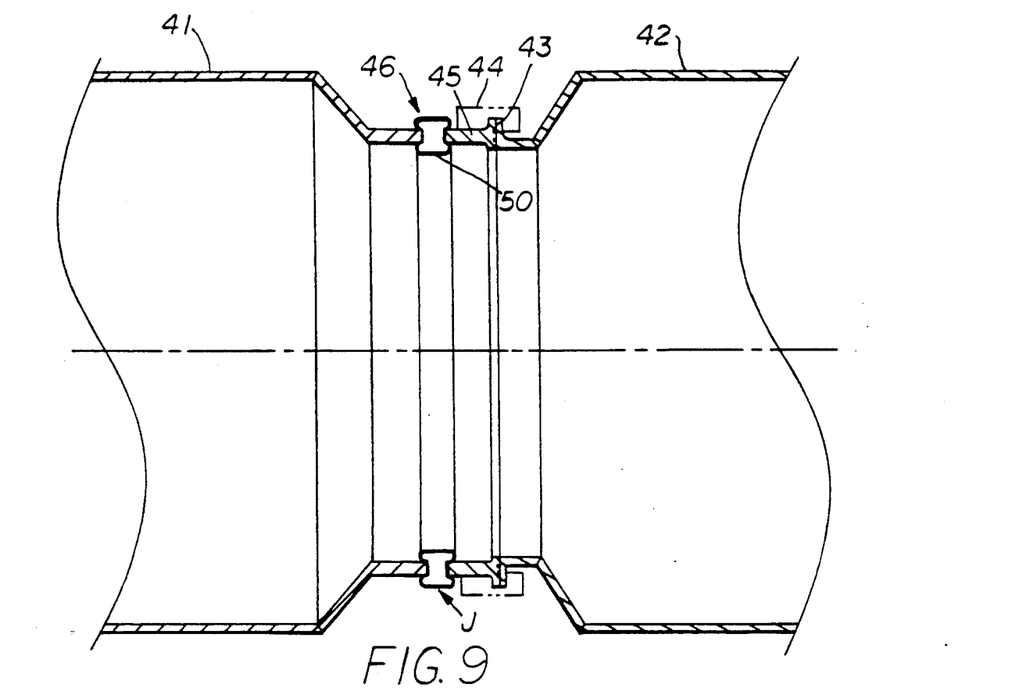
FIG. 9 is a cross section of another embodiment of the invention for use as a flex joint for pressure vessels designed for external pressure, such as undersea submersibles and habitats wherein the pressure differential causes the inflatable seal to be compressed, allowing flexibility under pressure.

In FIG. 9, there is shown another embodiment of the invention providing a flex joint for pressure vessels designed for external rather than internal pressure, such as undersea submersibles and habitats. The external pressure embodiment is designed so that the pressure differential causes the inflatable seal to be compressed, allowing flexibility under pressure. Pressure vessels 41 and 42 having walls of circular or other suitable cross section are interconnected by a novel joint J which compensates for lateral or angular misalignment. An interface seal 43 is attached by a device 44, the details of which are not a part of this invention.

Figure 9A:
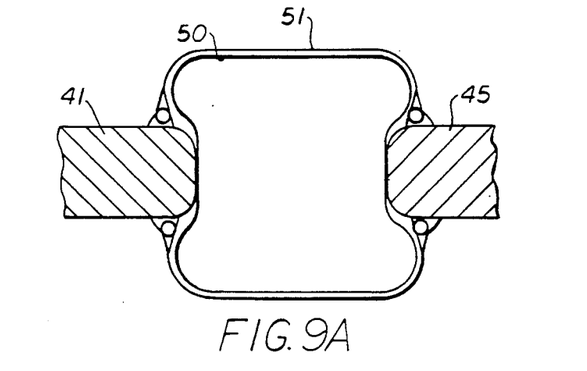
FIG. 9A is a is a detail cross section of the inflatable seal of FIG. 9 which consists of a hollow torus-shaped flexible bladder reinforced by a system of straps or fabric anchored to the hard structures.

The flex joint J comprises a floating structural segment 45 permanently attached to pressure vessel 41 by an inflatable toroidal seal 46. The external pressure on vessels 41 and 42 tends to compress the inflatable toroidal seal 46. The inflation pressure of the toroidal seal 46 is maintained above the internal/external pressure differential of the vessels 41 and 42 to maintain a controlled distance between the floating segment 45 and pressure vessel 41. The inflatable toroidal seal 46 comprises a hollow torus-shaped flexible bladder 50 reinforced by straps or fabric 51 (FIG. 9A) anchored to the hard structures. The joint J permits angular and lateral displacement of vessels 41 and 42 is the same manner as the displacement of vessels 1 and 2 in FIGS. 3 and 4.

Figure 10:
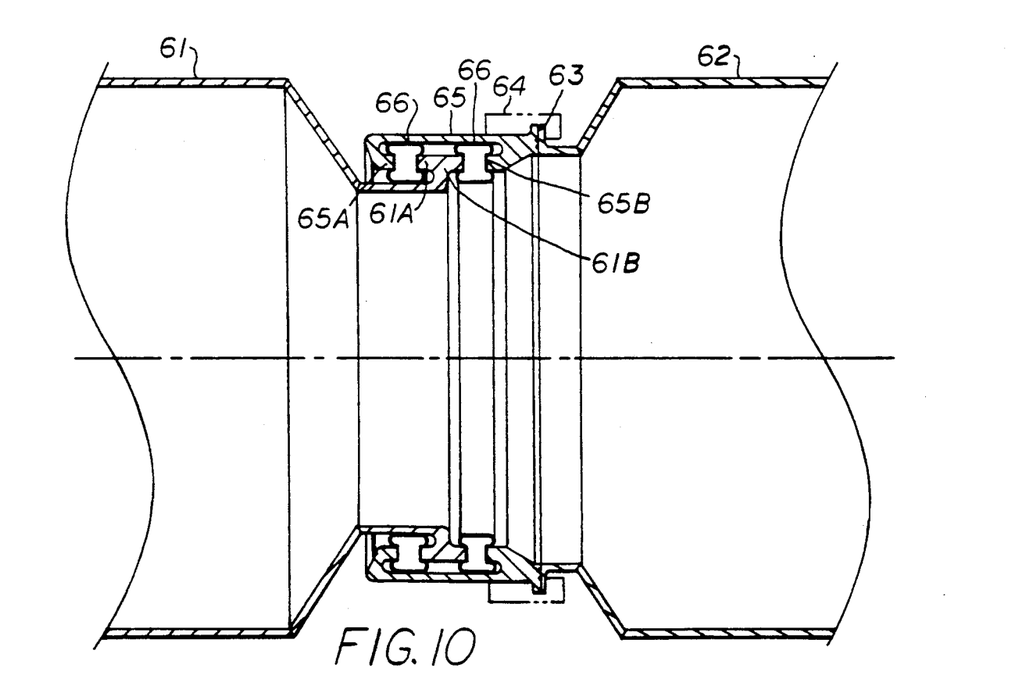
FIG. 10 is a cross section of another embodiment of the invention for use as a flex joint for pressure vessels designed for both internal and external pressure having two inflatable seals so that one is always under compression, thus allowing flexibility whether the pressure vessels are experiencing external pressure or internal pressure.

In FIG. 10, there is shown another embodiment of the invention providing a flex joint for pressure vessels designed for both external and internal pressure. In this embodiment, the joint J is configured with two inflatable seals so that one is always under compression. This allows flexibility whether the pressure vessels are experiencing external pressure or internal pressure. Pressure vessels 61 and 62 having walls of circular or other suitable cross section are interconnected by a novel joint J which compensates for lateral or angular misalignment. An interface seal 63 is attached by a device 64, the details of which are not a part of this invention.

The flex joint J comprises a floating structural segment 65 permanently attached to pressure vessel 61 by a pair of inflatable toroidal seals 66. The geometric configuration of the design (inturned flange 65A on segment 65 and outturned flange 61A on vessel 61) causes the tension between the vessels created by the internal gas pressure (which tends to separate vessels 61 and 62) to compress the first inflatable toroidal seal 66. The outturned flange 61B on vessel 61 and inturned flange 65B on segment 65 are compressed when external pressure is pressing vessels 61 and 62 together.

Figure 10A:
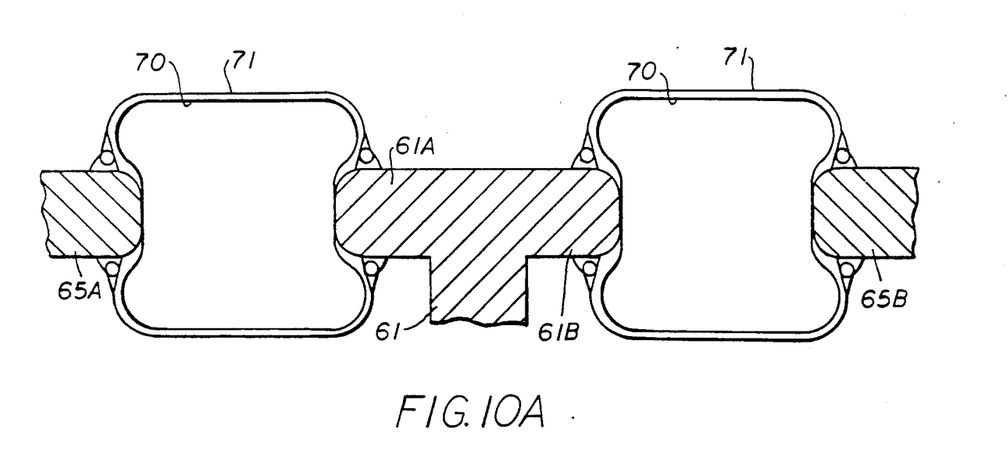
FIG. 10A is a is a detail cross section of the inflatable seal of FIG. 10 which consists of a hollow torus-shaped flexible bladder reinforced by a system of straps or fabric anchored to the hard structures.

The inflation pressures of the toroidal seals 66 is maintained above the internal/external pressure differentials of the vessels 61 and 62 to maintain a controlled distance between the floating segment 65 and pressure vessel 61. The inflatable toroidal seal 66 comprises a hollow torus-shaped flexible bladder 70 reinforced by straps or fabric 71 (FIG. 10A) anchored to the hard structures. The joint J permits angular and lateral displacement of vessels 61 and 62 is the same manner as the displacement of vessels 1 and 2 in FIGS. 3 and 4.

Figure 11:
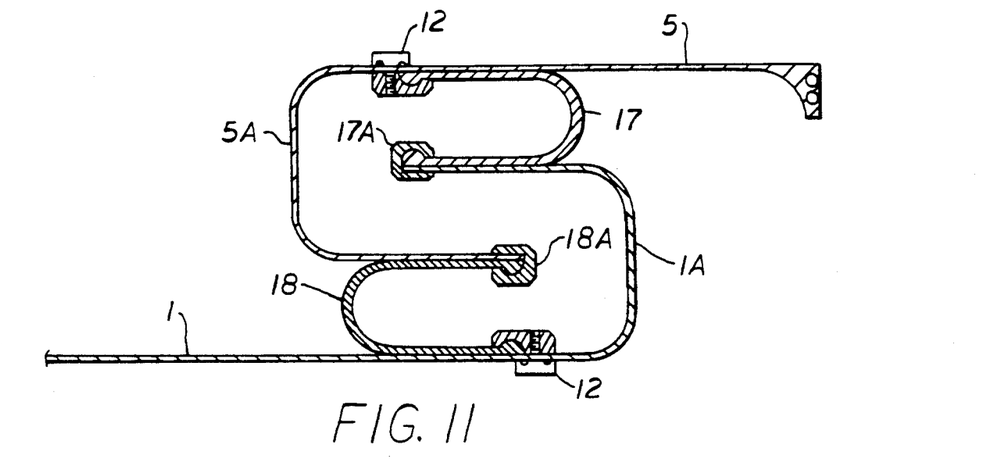
FIG. 11 is a detail cross section of another embodiment of the invention for use as a flex joint for pressure vessels where the axial displacement required of the flex joint is large in proportion to other displacements in which two rolling convoluted diaphragm seals contain the pressure needed to carry the axial load.
Figure 12:
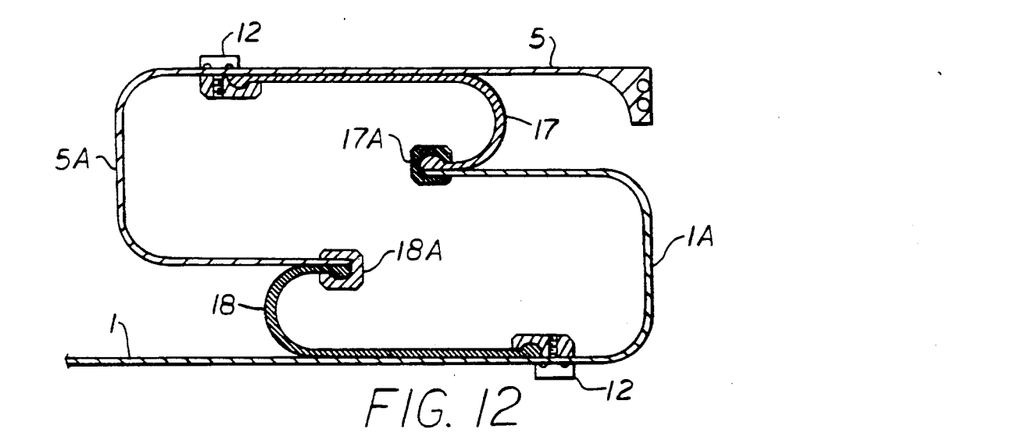
FIGS. 12 and 13 are cross sections of the embodiment shown in FIG. 11 which illustrate two different extremes of axial movement of the joint.
Figure 13:
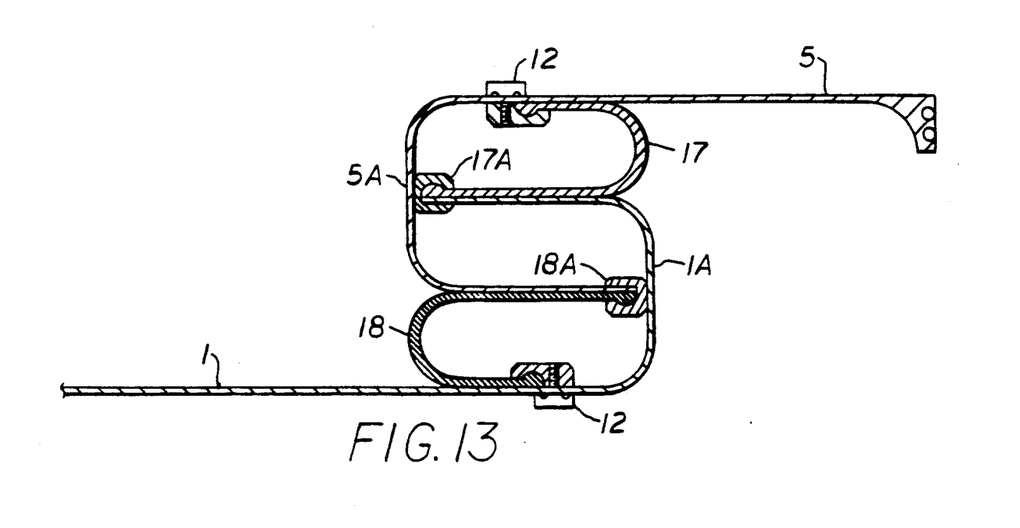

In FIGS. 11-13, a further embodiment of the invention is shown in which the axial displacement required of the flex joint is large in proportion to other displacements. An alternate configuration of the inflatable seal is provided to eliminate load changes due to hoop loads in the changing geometry.

In FIG. 11, two rolling convoluted diaphragm seals 17 and 18 are provided to contain the pressure needed to carry the axial load. Seals 17 and 18 are secured to vessel 1 and segment 5 by fasteners 12 and to flanges 1A and 5A by seal connectors 17A and 18A. Lateral displacements are still possible, and axial displacement will occur through the rolling action of the convoluted seals 17 and 18 without changing the load imparted by the hoop-tension in the seal material. The axial displacements possible (see FIGS. 12 and 13) are limited only by the length of the seal material and the length of the hard structures 1 and 5. The hard structures 1 and 5, flanges 1A and 5A, and seals 17 and 18, define a toroidal enclosure functioning in the same manner as bladder 10. The system retains the same other characteristics and capabilities mentioned previously of the torus-shaped inflatable seal.

While this invention has been shown fully and completely with special emphasis on certain preferred embodiments, it should be understood that within the scope of the appended claims the invention may be practiced otherwise than as specifically described herein.

I claim:

1. A flexible airtight joint for relatively movable hollow pressure vessels which is capable of carrying a tensile load in between the vessels created by an internal/external pressure differential, while still retaining flexibility in the lateral and angular directions, as well as in the axial direction should external forces exceed or negate said tension, comprising
    a first hollow pressure vessel with an open end and an outturned rigid flange, said outturned flange terminating in a first longitudinal end face,
    a second hollow pressure vessel with an open end and an inturned rigid flange, said inturned flange terminating in a second longitudinal end face, said vessels positioned relative to each other whereby said flanges are overlapping to form a chamber engaging the entire periphery of said vessels, and
    flexible means in said chamber whereby a secondary gas pressure of higher magnitude relative to said internal/external pressure differential is contained and creates a pressure distribution acting directly on said longitudinal end faces of said rigid flanges which will react with said tension between vessels independent of any rigidity in said flexible means whether inherent or resultant of any gas pressures.

2. A flexible airtight joint for relatively movable hollow pressure vessels according to claim 1 in which
    said chamber forming means comprises a flexible toroidal bladder positioned between said pressure vessel flanges.

3. A flexible airtight joint for relatively movable hollow pressure vessels according to claim 1 in which
    said chamber forming means comprises a flexible toroidal bladder positioned between said pressure vessel flanges, and
    flexible reinforcing material anchored to said vessels around said bladder to contain expansion of said bladder.

4. A flexible airtight joint for relatively movable hollow pressure vessels according to claim 1 in which
    said chamber forming means comprises a pair of rolling convoluted diaphragm operatively secured in spaced relation between said pressure vessel open ends to define a flexible toroidal chamber therebetween capable of extended longitudinal movement.

5. A flexible airtight joint for relatively movable hollow pressure vessels according to claim 1 including
    a floating structural segment secured in a floating but permanent relation to said first vessel and rigidly attached to said second vessel upon connecting of two vessels,
    said chamber forming means being positioned between flanges of said floating segment and said first vessel.

6. A flexible airtight joint for relatively movable hollow pressure vessels according to claim 5 in which
    said chamber forming means comprises a flexible toroidal bladder positioned between flanges of said floating segment and said first vessel.

7. A flexible airtight joint for relatively movable hollow pressure vessels according to claim 5 in which
    said chamber forming means comprises a pair of rolling convoluted diaphragm operatively secured in spaced relation between said floating segment and said second vessel to define a flexible toroidal chamber therebetween capable of extended longitudinal movement.

8. A flexible airtight joint for relatively movable hollow pressure vessels according to claim 6 in which
said predetermined pressure of said toroidal bladder is above the internal/external pressure differential of said vessels to maintain a controlled distance between said floating segment and said first vessel.

9. A flexible airtight joint for relatively movable hollow pressure vessels according to claim 6 including
flexible reinforcing material anchored to said flanges to contain expansion of said bladder.

10. A flexible airtight joint for relatively movable hollow pressure vessels according to claim 6 including
flexible reinforcing material anchored to said flanges to contain expansion of said bladder, and
said predetermined pressure of said toroidal bladder is above the internal/external pressure differential of said vessels to maintain a controlled distance between said floating segment and said first vessel.

11. A flexible airtight joint for relatively movable hollow pressure vessels according to claim 5 including
a high-pressure reservoir,
a pressure regulator,
conduit means connecting said reservoir to said regulator and said regulator to said flexible chamber, and
a relief valve connected to said chamber, whereby
movement of said vessels compressing or stretching said chamber increases or decreases the pressure in said bladder and allows excess pressure to vent through said relief valve or insufficient pressure to be resupplied by pressure from said reservoir through said regulator.

12. A flexible airtight joint for relatively movable hollow pressure vessels according to claim 11 including
compression-spring means positioned between said second vessel and said floating segment whereby the amount of gas that is fed into said flexible chamber extends or retracts said floating segment relative to said first vessel.

13. A flexible airtight joint for relatively movable hollow pressure vessels according to claim 12 including
means to control the amount of gas fed from said reservoir to said flexible chamber.

14. A flexible airtight joint for relatively movable hollow pressure vessels according to claim 11 in which
said predetermined pressure of said flexible chamber is above the internal/external pressure differential of said vessels to maintain a controlled distance between said floating segment and said first vessel.

15. A flexible airtight joint for relatively movable hollow pressure vessels according to claim 12 in which
said predetermined pressure of said flexible chamber is above the internal/external pressure differential of said vessels to maintain a controlled distance between said floating segment and said first vessel.

16. A flexible airtight joint for relatively movable hollow pressure vessels according to claim 13 in which
said predetermined pressure of said flexible chamber is above the internal/external pressure differential of said vessels to maintain a controlled distance between said floating segment and said first vessel.

17. A flexible airtight joint for relatively movable hollow pressure vessels according to claim 5 including
a pair of flexible toroidal bladders positioned between said vessels and operable to be compressed on either compressing or separating movement of said vessels or on angular or lateral displacement thereof.

18. A flexible airtight joint for relatively movable hollow pressure vessels according to claim 5 in which
said floating structural segment has an inturned flange with forward and rearward facing surfaces,
said second vessel has an outturned flange with forward and rearward facing surfaces positioned between said forward and rearward facing surfaces on said inturned flange and movable therebetween, and
a pair of flexible toroidal bladders positioned between said outturned flange forward and rearward facing surfaces and said inturned flange forward and rearward facing surfaces and operable to be compressed on either compressing or separating movement of said vessels or on angular or lateral displacement thereof.

19. A flexible airtight joint for relatively movable hollow pressure vessels according to claim 5 in which
a floating structural segment secured in floating relation to said first vessel has an inturned flange,
said second vessel has an outturned flange positioned in spaced relation to said inturned flange, and
said chamber forming means comprises a pair of rolling convoluted diaphragms one secured between said inturned flange and said second vessel and one secured between said outturned flange and said floating segment to define a flexible toroidal chamber therebetween capable of extended longitudinal movement.

* * * * *